Nov. 7, 1933.   K. H. MOLL ET AL   1,934,083
MANUFACTURE OF STEEL
Filed Sept. 12, 1932
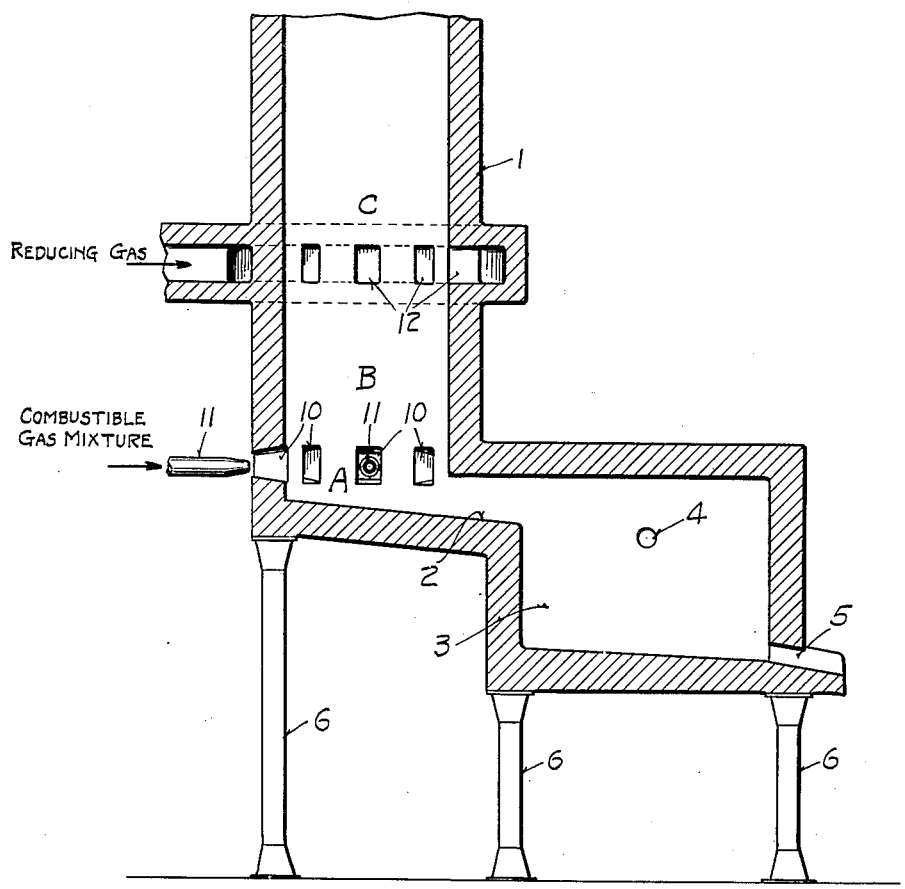
INVENTORS:
Karl H. Moll
Harold Etherington
BY
ATTORNEY.

Patented Nov. 7, 1933

1,934,083

UNITED STATES PATENT OFFICE 1,934,083

MANUFACTURE OF STEEL

Karl H. Moll, Neuwied, Germany, and Harold Etherington, Milwaukee, Wis., assignors to A. O. Smith Corporation, Milwaukee, Wis., a corporation of New York Application September 12, 1932
Serial No. 632,788

7 Claims. (Cl. 75—17)

The invention relates to methods of manufacturing steel directly by the reduction of iron ores, and especially to methods which utilize reducing gases for controlling the temperatures and for providing the reducing agent.

It is among the objects of the invention to reduce oxides of iron and produce molten material having carbon contents of steels, say about 0.3% to 1.5% carbon.

Another object of the invention is to provide for utilizing non-solid hydrocarbons for the reduction and heating, and to utilize a small amount of solid carbonaceous material as the main source of carbon in the steel.

The method comprises charging a shaft type of furnace with iron ore, flux and an amount of solid carbonaceous material such as coke which is insufficient in quantity to provide heat for the process by combustion with air. Hydrocarbon gas may be used as the principal reducing agent. It is introduced a short distance above the melting zone so as to provide an intermediate zone in the shaft which is permeable and where the iron becomes softened or partially melted. The reducing gases at once mix with the gases from the melting flame, reduce the temperature of the flame gases and provide a mixture of gases which reduces the ore. Temperatures in the reducing zone are maintained below sintering temperatures of the partially reduced ore and at least as high as reducing temperatures. A quantity of reducing gas sufficient to reduce the ferrous oxide to iron and to provide a sufficiently non-oxidizing atmosphere in upper portions of the shaft, which will materially prevent removal of the solid carbonaceous material from the charge by combination with the gases which pass through the upper parts of the furnace, is provided by suitable regulation of the quantity and temperature of the reducing gases and the flame gases.

The heat for heating the ore to reducing temperatures is derived mainly from the melting flame which is produced by the combustion of gaseous or liquid fuel in the lowest or melting zone of the shaft. The intense melting flame is produced by burning a mixture of hydrocarbons and air, and is impinged on the bed of coke, flux and reduced material at the bottom of the shaft only a short distance below the point of introducing the reducing gases. This bed acts as a support for the charge and as a medium permeable to the gases. Thereby, we provide a melting zone so short that hanging up of the charge is avoided.

Between the point of actual melting and the point of introducing the reducing gases is a shallow bed composed of iron in solid and plastic condition containing some fluxible material, the flux and coke. Material oxidation of the reduced iron and accompanying carbon are avoided by the short time afforded for the passage of the flame gases through the shallow bed. Although the gases from the melting flame are generally oxidizing with respect to the highly heated iron, the oxidation in this shallow intermediate bed or zone is minimized by maintaining a melting flame as near neutrality as possible. The melting flame is regulated so as to give an intensity sufficient to melt the steel, and the volume of gas is regulated so that the flame gases will have a heat capacity sufficient to heat the upper layers of charge and the reducing gas to reducing temperatures. However, small amounts of heat may be added with the reducing gases, such as that which may be generated by preheating the reducing gas by various means.

At and above the reducing temperatures of iron oxides, the hydrocarbon gases, such as methane, butane and hydrocarbons of higher molecular weight are broken down into molecules which are more stable at these temperatures. This reaction is endothermic. Heat to raise the reducing gas to reduction temperatures of the ore is provided mainly by mixing the reducing gases with the melting-flame gases in which flame the quantities of heat in excess of the minimum needs for fluxing and melting the reduced charge can be generated.

In order to maintain efficient reduction of ore, it is necessary to retain the ore in a porous condition and avoid sintering thereof. This requires that the temperature of the flame gases be lowered and that the mixture of flame and hydrocarbon gases shall contain a sufficient quantity of reducing gases to reduce the ore, that the reducing gases shall be in sufficient concentration to retain solid carbonaceous material in the charge to carburize the iron in the melting zone, and that the temperature in the reducing zone shall be below sintering temperatures and at least as high as reducing temperatures.

Applicants have found that the described conditions are attainable by melting with the heat of a flame, provided two sets of tuyères spaced a short distance apart to maintain the described shallow bed between the point of melting and the point of introducing the reducing gas, absorbing some of the heat of the flame in heating and decomposing hydrocarbons, and by regulating the input of combustible and reducing gases.

The following particular operations for putting the process into effect for the purpose of manufacturing steel from iron ore are described as illustrations of the invention. The ore was a hematite ore containing approximately 51% iron. The ore and limestone were in about 4 inch sizes and the coke was in about 6 inch sizes and they contained small amounts of silica. The gas was a natural gas containing about 68% methane, 17% ethane, 1.5% butane and the remainder mainly nitrogen.

*Example 1.*—The charge was composed of a mixture of the ore, limestone and coke in the proportion of 200 pounds of ore, 10 pounds of coke and 35 pounds of limestone. It was fed into the top of an upright shaft furnace by means of a charging bell of suitable construction as the melted iron, coke and flux were consumed at the bottom of the shaft and carried off into a forehearth. The gases required to reduce and melt the charge were 1100 cubic feet of natural gas and 4000 cubic feet of air per 200 pounds of ore. The air was preheated to 1800° F. by passing it through preheaters. About 40% of the natural gas and 60% of the air were burned in the melting flame and utilized directly for melting, fluxing and heating. The remainder of the gas and air were introduced through the reducing gas tuyères which tuyères determined approximately the upper level of the shallow intermediate zone.

The melting flame was produced by efficiently mixing the gas and air in a burner in which the mixing and combustion of the gas were carried on as close to the shaft as possible in order to avoid heat losses and to obtain a substantially complete combustion of the gases before the flame impinged upon and permeated the shallow bed.

About 100 pounds of steel containing 0.5% carbon were produced per 200 pounds of ore. The molten steel and slag were removed from the melting zone as fast as they were formed and they were collected in a forehearth from which the steel was removed and separated from the slag by tapping the steel into a ladle.

*Example 2.*—The charge was composed of iron ore, steel scrap which contained about 0.5% carbon, coke and limestone which were mixed in the proportion of 120 pounds of ore, 40 pounds of scrap, 10 pounds of coke and 20 pounds of limestone. The gases required to reduce and melt the charge were 750 cubic feet of natural gas and 2750 cubic feet of air per unit of the above described charge. The air was preheated to 1800° F. and the same proportions of the gas and air as in Example 1 were introduced in the melting flame and reducing gas tuyères respectively. This operation produced 100 pounds of steel per unit of charge which steel contained 0.5% carbon.

*Example 3.*—The charge described in Example 1 was reduced with a cracked gas composed of about 90% hydrogen. Both the hydrogen and air were preheated to 1800° F. About 1900 cubic feet of the cracked gas and 700 cubic feet of air were used per unit of charge and all of the air was used in producing the flame. The steel produced contained 0.5% carbon.

*Example 4.*—The charge described in Example 1 was used and the same amounts of air and gas were required. The operation was the same as Example 1 except that all of the air was used in the melting flame. The product was molten steel which contained about 0.5% carbon.

It was found that the proportion of reducing gas which was introduced into the reducing zone could be varied between about 30% and 70% and the air used with this gas varied between 0% and 40%, but other variations could be made especially when external conditions were varied or when material variations in optimum temperatures of the various zones in the furnace were found.

Excellent results were obtained by maintaining flame temperatures of about 1900° to 2300° C. and regulating the flame so as to maintain approximately neutral conditions. By the term approximately neutral, we mean a neutral, nearly neutral or slightly oxidizing condition. Sufficient temperatures for melting are not generally obtained with reducing flames, but slightly reducing flames are not objectionable if sufficient heat can be generated to perform the melting and overcome the cooling due to the cracking of the gas. The gas and air should be thoroughly mixed before burning to avoid the presence of jets of gas or air in the flame which may come into contact with the iron. A jet of unmixed air in the flame will oxidize the iron. Jets of unmixed or unburned gas are cracked by coming in contact with the iron and they cool the iron, thereby tending to defeat the purpose of the melting flame.

The reducing gas is introduced in quantities sufficient to reduce the ore and a flame is maintained sufficiently to melt and flux the iron and to heat the reducing gas to reducing temperatures, say 900° to 1100° C. All of the heating may be accomplished with the melting flame, but a convenient regulation of the process is obtained by introducing a part of the heat with the reducing gases, for example as preheat in one or both of the gases which may be obtained by partial combustion of the reducing gas. The amount of heat introduced with the reducing gases can be widely varied in accordance with the heat requirements of the reducing agent. Hydrocarbons which have stronger endothermic reactions upon being reformed require more heat than do those in which the endothermic reaction is less.

This method of reduction carried out in a shaft type furnace with a forehearth in which the melted fluxed product is removed as fast as it is formed and the carbon is not submerged in a pool of molten iron at the bottom of the shaft produces steel which is exceptionally free from sulphur and phosphorus. The use of an extremely short melting period at the high temperatures involved combined with the use of relatively small amounts of material that carry carbon and sulphur and the avoidance of relatively long heating periods at temperatures between the reducing temperatures and melting temperatures as encountered in coke fired blast furnaces, is believed to contribute to this exceptional result, but it is to be understood that the invention is not limited by the proposed theory. Low sulphur is due in part to the presence of only small amounts of coke and the phosphorus is commonly low in steel when the carbon is low. By using charges which contain about 0.5% sulphur, 0.1% phosphorus and 10% silica, about 0.05% sulphur, 0.05% phosphorus and 0.05% silicon are carried by the steel.

Furnaces used in carrying out the process may be constructed in accordance with well known designs for the shafts of cupolas and blast furnaces which are provided with a forehearth or receptacle in which the steel is collected, except that the tuyères at the bottom of the shaft are arranged for mixing and burning gaseous or liquid fuel in accordance with the above described principles and the melting tuyères are supplemented by a second series of tuyères for introducing reducing gases which are located a short distance above the melting tuyères so as to provide the described intermediate shallow bed. The thickness of this bed may be varied as the diameter of the furnace may require. An intermediate bed about 4 to 10 feet deep is generally sufficient, but beds of greater or less depth can be used. In no case should the melting and reducing tuyères be placed so close together that effective melting and fluxing of the reduced material is prevented, and they should not be separated so far that the gases from the melting flame are permitted to be in contact with the iron and coke for a period sufficient to materially oxidize the iron. It is evident that the best thickness of the bed will vary as the diameters of the shafts, as the nature of the materials involved in the reaction and as the speed of melting and reducing are varied.

The sole figure of the drawing is a diagrammatic representation of the lower portion of a shaft furnace in which the described process may be carried out. The furnace comprises an upright shaft 1 having a forehearth 2 at the bottom. The forehearth is provided with a crucible 3 to collect the molten metal and slag which are removed from the melting zone A through the sloping forehearth as fast as the reduced material is melted. The slag is removed through the slag hole 4 and the crucible is tapped from time to time to remove the molten metal through the tap hole 5. The structure is supported on a suitable substructure, such as the pillars 6.

Openings 10 are made at the lower end of the shaft around the melting zone A for admitting the melting flames, and the burners 11 which are adapted and arranged to produce the described melting flames are disposed to direct the flames through the openings 10 into the melting zone. Other openings 12 a short distance above the melting zone are provided to admit reducing gas, either alone or admixed with air. The shallow permeable bed composed of reduced ore, flux and solid carbonaceous material is in the region B or intermediate zone of the shaft between the melting zone and the openings 12. The reducing zone C extends upwardly from the openings 12, and above the reducing zone a section of the furnace of suitable length which is not shown in the drawing constitutes a preheating zone. Any of the well known devices for charging the shaft with solid carbonaceous material, ore and flux and for discharging the off-gas can be mounted at the top but none are shown in the drawing.

We claim:

1. The method of manufacturing steel which comprises charging a mixture of flux, carbonaceous material and one into a shaft furnace, the carbonaceous material being sufficient to provide a carbon content in the melted iron of about 0.3% to 1.5% and insufficient to provide for melting the iron by combustion; blowing a flame burning hydrocarbon material on the charge at the bottom of the shaft for melting reduced iron in the presence of said flux and carbonaceous material; and providing a shallow zone containing reduced iron, flux and solid carbon above the melting flame by adding hydrocarbon gases to the ascending products of combustion a short distance above said flame in quantities sufficient to reduce the ore at the rate of melting and to reduce the temperature of the gases below sintering temperatures of the unreduced ore.

2. The method of manufacturing steel which comprises charging a mixture of flux, carbonaceous material and ore into a shaft furnace, the carbonaceous material being sufficient to provide a carbon content in the melted iron of about 0.3% to 1.5% and insufficient to provide for melting the iron by combustion; blowing a flame burning hydrocarbon material on the charge at the bottom of the shaft for melting reduced iron in the presence of said flux and carbonaceous material; adding hydrocarbon gases to the ascending products of combustion of said flame in quantities sufficient to reduce the ore at the rate of melting by the flame; and supplying sufficient heat to said charge, products of combustion and reducing gas to raise the charge at least to reducing temperatures but not to the sintering temperatures of the unreduced charge.

3. The method of manufacturing steel which comprises charging a mixture of flux, carbonaceous material and ore into a shaft furnace, the carbonaceous material being sufficient to provide a carbon content in the melted iron of about 0.3% to 1.5% and insufficient to provide for melting the iron by combustion; blowing a flame burning hydrocarbon material on the charge at the bottom of the shaft for melting reduced iron in the presence of said flux and carbonaceous material; adding hydrocarbon gases to the ascending products of combustion of said flame in quantities sufficient to reduce the ore at the rate of melting by the flame; and heating the mixture of reducing gases to raise the charge at least to reducing temperatures but not to sintering temperatures thereof.

4. The method of manufacturing steel which comprises charging a mixture of flux, carbonaceous material and ore into a shaft furnace, the carbonaceous material being sufficient to provide a carbon content in the melted iron of about 0.3% to 1.5% and insufficient to provide for melting the iron by combustion; blowing a flame burning hydrocarbon material on the charge at the bottom of the shaft for melting reduced iron in the presence of said flux and carbonaceous material; adding hydrocarbon gases to the ascending products of combustion of said flame in quantities sufficient to reduce the ore at the rate of melting by the flame; and partially burning hydrocarbons to supply additional heat to raise the charge at least to reducing temperatures but not to sintering temperatures thereof.

5. The method of manufacturing steel which comprises charging a mixture of flux, carbonaceous material and ore into a shaft furnace, the carbonaceous material being sufficient to provide a carbon content in the melted iron of about 0.3% to 1.5% and insufficient to provide for melting the iron by combustion; blowing a flame burning hydrocarbon material on the charge at the bottom of the shaft for raising the temperature of reduced iron to about 1900° to 2300° C. for melting reduced iron in the presence of said flux and carbonaceous material; and adding hydrocarbon gases to the ascending products of combustion of said flame in quantities sufficient to reduce the ore at the rate of melting by the flame and to give reducing temperatures of about 900° to 1100° C.

6. The method of manufacturing steel which comprises charging a mixture of carbon-containing iron, flux, carbonaceous material and ore into a shaft, the carbon constituting about 0.3% to 1.5% of the iron in the ore; adding reducing gas intermediate the ends of the shaft to reduce the ore and cool hot ascending gases to temperatures between reducing temperatures and sintering temperatures of the partially reduced ore; and maintaining a shallow porous bed containing flux, reduced ore and carbonaceous material in the bottom of the shaft by blowing a substantially neutral flame thereinto a short distance below the level of introducing the reducing gas, by melting the iron in such bed in the presence of said carbonaceous material and flux at the rate of reducing the ore, and by removing said carbon-containing iron and reduced iron from said shallow bed as fast as it is melted.

7. The method of manufacturing steel which comprises charging a mixture containing ore, flux and carbonaceous material into a shaft furnace sufficient to provide a carbon content of about 0.3% to 1.5% in the iron of said ore when it is reduced and insufficient to provide heat by combustion for melting said iron, adding reducing gas intermediate the ends of the shaft in quantity sufficient to reduce said ore and to make a mixture with hot ascending gases to give temperatures in the charge below sintering temperatures and at least as high as reducing temperatures of the ore, regulating the cooling effect of the reducing gases by varying the preheating of the same, blowing a substantially neutral flame into the reduced charge near the bottom of the shaft and a short distance below the level of introducing said reducing gases to flux the ore and form molten steel, and removing the melt as fast as it is formed, whereby a shallow bed of permeable material is maintained to support the contents of the shaft.

KARL H. MOLL.
HAROLD ETHERINGTON.